(12) United States Patent
Cassel et al.

(10) Patent No.: US 6,199,921 B1
(45) Date of Patent: Mar. 13, 2001

(54) PIPE LAP JOINT WITH BRIDGED SLOT

(75) Inventors: Scott T. Cassel, Bloomfield Hills; Michael E. Amedure, Lake Orion, both of MI (US)

(73) Assignee: BKS Company, LLC, Birmingham, MI (US)

( * ) Notice: Subject to any disclaimer, the term of this patent is extended or adjusted under 35 U.S.C. 154(b) by 0 days.

(21) Appl. No.: 09/324,176

(22) Filed: Jun. 3, 1999

Related U.S. Application Data

(60) Provisional application No. 60/088,094, filed on Jun. 5, 1998.

(51) Int. Cl.[7] .................................................. F16L 25/00
(52) U.S. Cl. ............................ 285/424; 285/382; 285/420
(58) Field of Search ..................................... 285/424, 382, 285/382.2, 399, 420

(56) References Cited

U.S. PATENT DOCUMENTS

| 4,056,273 | * | 11/1977 | Cassel . | |
|---|---|---|---|---|
| 4,113,289 | * | 9/1978 | Wagner et al. | 285/322 |
| 4,629,226 | * | 12/1986 | Cassel et al. | 285/382 |
| 4,660,862 | * | 4/1987 | Cassel et al. | 285/114 |
| 4,753,462 | * | 6/1988 | Liu | 285/420 |
| 4,902,049 | * | 2/1990 | Umehara | 285/347 |
| 5,588,680 | * | 12/1996 | Cassel et al. | 285/3 |
| 5,924,282 | * | 7/1999 | Thomas | 60/323 |
| 5,944,365 | * | 8/1999 | Kizler et al. | 285/420 |
| 6,089,624 | * | 7/2000 | Cassel et al. | 285/382 |

\* cited by examiner

*Primary Examiner*—Teri Pham Luu
(74) *Attorney, Agent, or Firm*—Reising, Ethington, Barnes, Kisselle, Learman & McCulloch, P.C.

(57) ABSTRACT

A pipe lap joint is disclosed with an improved sealing zone structure in the overlap region of the pipes. The sealing zone comprises a slot extending from the end of the outer pipe to an inner end wall of the slot. The joint comprises a band clamp with a clamping band which covers the sealing zone including the inner end of the slot. The slot has a bridge extending between the sidewalls and dividing the slot into an outboard slot segment and an inboard slot segment. The bridge has an axial dimension which is substantially smaller than the axial length of either of the slot segments. When the band clamp is tightened, the sealing zone is collapsed by collapse of the slot and consequent deformation of the bridge such that it obstructs fluid flow between the slot segments.

8 Claims, 2 Drawing Sheets

US 6,199,921 B1

PIPE LAP JOINT WITH BRIDGED SLOT

This Application claims the benefit of Provisional Application 60/088,094 filed Jun. 5, 1998.

FIELD OF THE INVENTION

This invention relates to pipe couplings and, more particularly, to a pipe lap joint especially adapted for use in vehicle exhaust systems.

INVENTION BACKGROUND

In vehicle exhaust systems it is desirable for pipe joints to have high pull-apart strength and to provide a good fluid seal between the pipes. It is becoming increasingly important to provide exhaust pipe couplings that achieve greater reliability and uniformity in providing a good fluid seal.

In U.S. Pat. No. 4,629,226, granted Dec. 16, 1986 to Cassel, a pipe lap joint is disclosed which provides a collapsible sealing zone in the outer pipe. The sealing zone is formed by providing a pair of intersecting end-to-end slots in the outer pipe which provide relief for circumferential contraction of the sealing zone within an overlap region where the pipe ends overlap. A clamping band is disposed around the outside pipe and covers the inboard slot. When the clamping band is tightened around the outside pipe the sealing zone of the outer pipe is collapsed into close fitting engagement with the inner pipe. The intersecting outboard and inboard slots are circumferentially offset. Adjacent sidewalls of the slots are in substantial alignment with each other. The inner end wall of the outboard slot is in substantial alignment with the outer end wall of the inboard slot. With this alignment and with the sidewalls and end walls of the slots being rectilinear, an inner corner of the outboard slot makes a point-to-point intersection with an outer corner of the inboard slot. With this structure, only a very small amount of collapse of the outer pipe is necessary to cause a sealing engagement between the inner end wall of the outboard slot and the outer end wall of the inboard slot.

The Cassel et al. U.S. Pat. No. 5,588,680 discloses a pipe lap joint for vehicle exhaust system in which a pair of non-intersecting end-to-end slots are provided to afford relief for circumferential contraction of a sealing zone within an overlap region of two overlapped pipe ends. With this construction, precise location of the adjacent corners of the slots is required and the sidewalls and end walls that form the corners are rectilinear. In this pipe joint, a fluid seal is obtained upon tightening of the clamp on the outer pipe even though there is no substantial contraction of the sealing zone by collapse of the slots because a frangible bridging segment of the pipe wall extends between adjacent corners of the slots. Thus, the slots are isolated from each other when the frangible bridging element is either only slightly deformed or when it is completely fractured by collapse of the overlap region of the outer pipe.

A general object of this invention is to overcome certain disadvantages of the prior art and to provide a pipe lap joint with an improved sealing zone.

INVENTION SUMMARY

In accordance with this invention, a pipe lap joint is provided that exhibits good fluid sealing and pull-apart strength and that can be manufactured at low cost.

Further, in accordance with this invention, a pipe lap joint is provided in which an overlap region of an outside pipe over an inside pipe comprises a collapsible sealing zone with at least one slot extending from the end of the outer pipe to an inner end wall of the slot. The slot has an open end at the end of the outer pipe and terminates in a closed end within the overlap region of the pipe ends. The slot also has two generally parallel sidewalls that extend from the open end to the closed end, the closed end being defined by an end wall.

Further, in accordance with the invention, an integral bridge integrally extends from each sidewall and spans the slot adjacent the open end. The bridge is configured to collapse as the sidewalls of the slot move toward each other in response to the application of inward clamping pressure around the lap joint. The bridge collapses into a position that provides a fluid seal or sealing zone across the slot and between the inner and outer pipes.

Further in accordance with the invention, the bridge of the pipe wall is configured to seal off the slot by blocking axial fluid flow through the slot. The bridge seals off the slot whether or not the diametrical gap between the outer pipe and the inner pipe is large enough to require that the outer pipe be collapsed around the inner pipe to fit tightly around the inner pipe. In other words, a fluid seal is obtained upon tightening of the clamp on the outer pipe even though there is no contraction of the sealing zone by collapse of the slot because the bridge of the pipe wall extends across the slot adjacent the open end. Thus, the bridge isolates an axial inner portion of the slot from an outer portion of the slot whether or not the bridge is deformed at all by collapse of the overlap region of the outer pipe.

Still further in accordance with the invention, the bridge is configured so that the collapse of the outer pipe will not distort the bridge in such a way as to permit any significant leakage past or through the slot. This is because, for each embodiment, the bridge is configured to collapse without creating a gap between the bridge and the outer pipe 12 or between the bridge and the inner pipe 14. In other words, the bridge is a continuous unbroken structure from one sidewall to the other in both its collapsed and uncollapsed configuration.

DESCRIPTION OF THE PREFERRED EMBODIMENT

Figure 1:
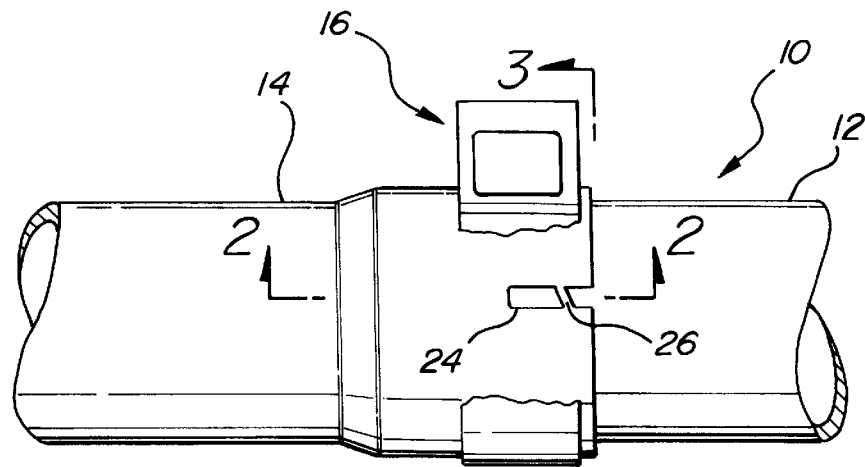
FIG. 1 is an elevational view of a lap joint constructed according to the invention with the parts in assembled relation but before the clamp is tightened.

A lap joint constructed according to a first illustrative embodiment of the present invention is generally indicated at 10 in FIGS. 1–5. A pipe lap joint constructed according to a second embodiment of the invention is generally indicated at 10' in FIGS. 6 and 7 and a pipe lap joint constructed according to a third embodiment is generally indicated at 10" in FIGS. 8 and 9. Reference numerals with the designation prime (') in FIGS. 6 and 7 and the designation double-prime (") in FIGS. 8 and 9 indicate alternative configurations of elements that also appear in the first or second embodiment. Unless indicated otherwise, where a portion of the following description uses a reference numeral to refer to the figures, I intend that portion of the description to apply equally to elements designated by primed and double-primed numerals in FIGS. 6–9.

Figure 2:
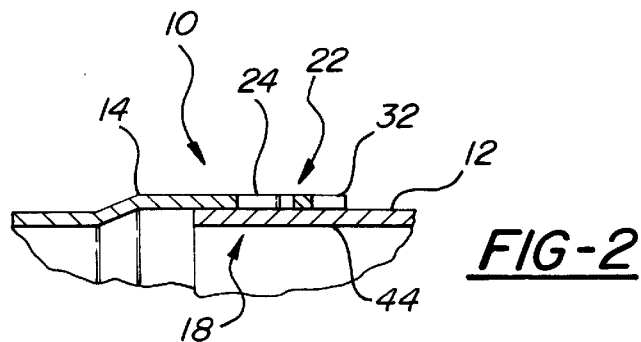
FIG. 2 is a fragmentary cross-sectional view taken along line 2—2 of FIG. 1.
Figure 3:
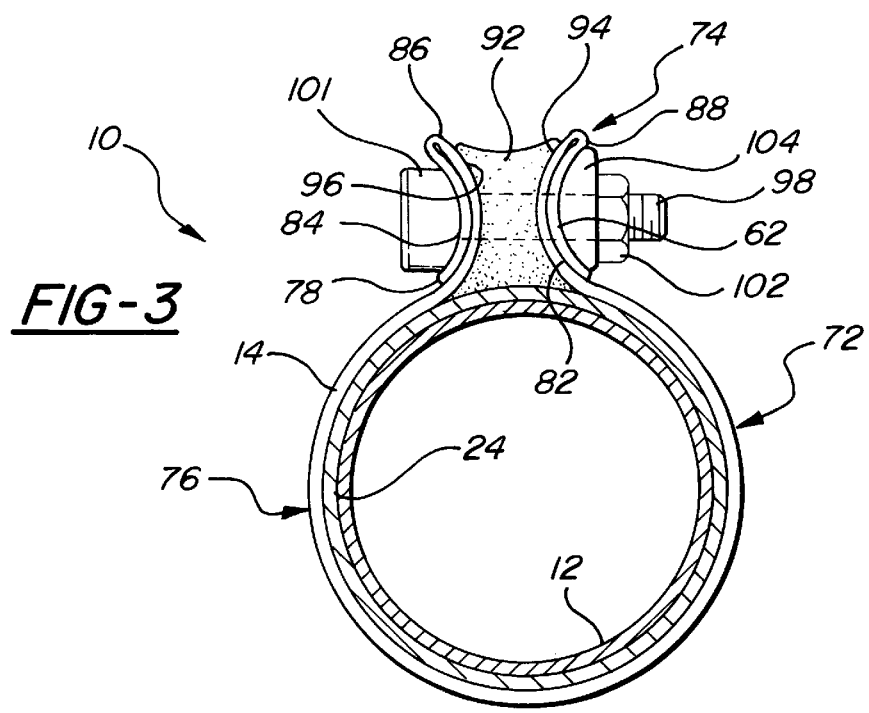
FIG. 3 is a cross-sectional end view taken along line 3—3 of FIG. 1.

As shown in FIGS. 1–3, the pipe lap joint 10 comprises, in general, inside and outside pipes 12 and 14, respectively, in a telescoping relationship. The lap joint 10 also includes a band clamp 16 for holding the pipes together and causing the inside and outside pipes 12, 14 to engage each other in a fluid sealing relationship. The outside pipe 14 has a lap portion which extends over the inside pipe to provide an overlap region 18 of the pipes 12, 14 as shown in FIG. 2. To provide a fluid seal between the pipes, a radially collapsible sealing zone 22 is provided on the outside pipe 14 in the overlap region.

The sealing zone 22 comprises a ring-shaped portion of a free end of the outside pipe 14. The sealing zone 22 is configured to be contracted or collapsed in a radial direction by the clamp 16 so that the sealing zone 22 is in close fitting engagement with the inside pipe 12. To facilitate the collapse or contraction of the sealing zone 22, an end portion of the outside pipe 14 is provided with a slot 24. In the illustrative embodiment, only a single slot 24 is used. However, in other embodiments, it may be desirable to use two or more slots 24 spaced circumferentially around the pipe 14.

Figure 4:
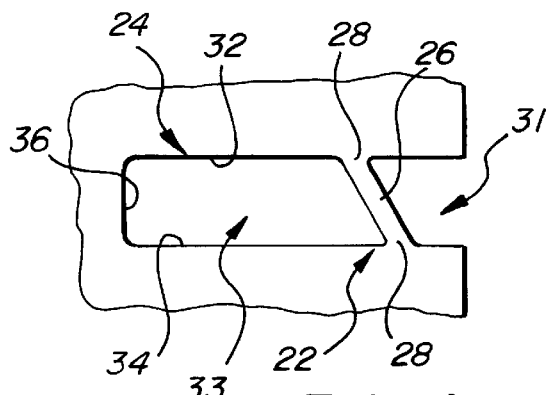
FIG. 4 is a magnified view of a slot in the lap joint of FIG. 1 before an outer pipe of the lap joint is collapsed around an inner pipe of the lap joint.
Figure 5:
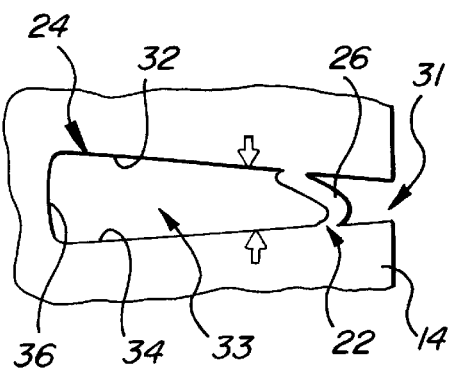
FIG. 5 is a magnified view of the slot of FIG. 4 after the outer pipe is collapsed.

The slot 24 is shown in the assembly view of FIG. 1 and is shown in more detail in FIGS. 4 and 5. The slot 24 has an open end at the end of the outer pipe 14. The slot 24 extends generally in the axial direction of the pipe to a closed end that is disposed within the sealing zone 22 on the outside pipe 14. The slot 24 is bounded by a pair of generally parallel sidewalls 32, 34 and an arcuate end wall 36. The slot 24 extends from the end wall 36 to the open end of the slot 24 at the end of the outside pipe 14. A bridge 26 extends across the slot 24.

The bridge 26, formed by the wall of the outside pipe 14, integrally extends into the slot 24 from a juncture zone 28 at each sidewall 32, 34 and spans the slot 24 adjacent the open end. The bridge 26 divides the slot into an outboard slot segment 31 and an inboard slot segment 33 and blocks fluid flow therebetween. The bridge 26 is oriented diagonally or obliquely across the slot in relation to the sidewalls 32, 34. The diagonal orientation of the bridge 26 facilitates its collapse as the sidewalls 32, 34 of the slot 24 move toward each other in response to the application of inward clamping pressure around the lap joint 10. The collapse may include a gentle bending of the bridge along its length into a general S-shape and/or a more acute bending of the bridge at the juncture zones as shown in FIG. 5. In any event, the bridge 26 collapses into a position that provides a fluid seal or sealing zone across the slot 24.

Figure 6:
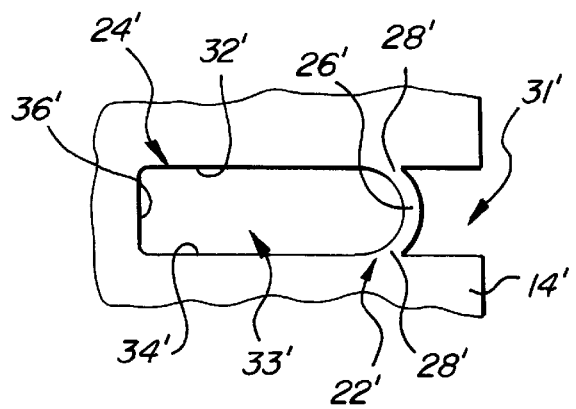
FIG. 6 is a magnified view of a lap joint slot constructed according to a second embodiment of the present invention.
Figure 7:
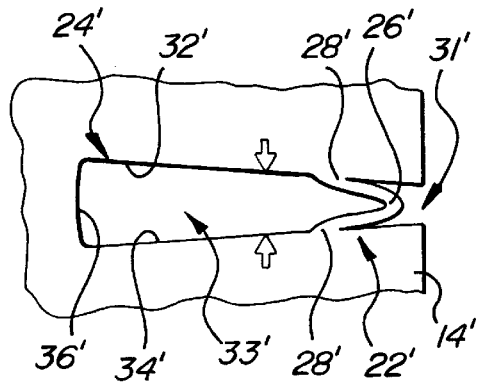
FIG. 7 is a magnified view of the lap joint slot of FIG. 6 after the outer pipe is collapsed.

As shown in FIG. 6, the bridge 26' of the second embodiment is of arcuate or quarter-moon shape across the slot 24' with a convex edge adjacent the open end of the slot 24'. As with the diagonal orientation of the bridge 26 in the first embodiment, the arcuate shape of the bridge 26' facilitates its collapse as the sidewalls 32', 34' of the slot 24' move toward each other in response to the application of inward clamping pressure around the lap joint 10'. The collapse generally includes a gentle bending of the bridge 26' along its length into a more acute convex configuration as shown in FIG. 7. In this more acute convex configuration, the bridge 26' continues to provide a fluid seal across the slot 24'. While the bridge in the illustrative embodiment has a convex edge adjacent the open end of the slot other embodiments may have a concave edge adjacent the open end of the slot.

Figure 8:
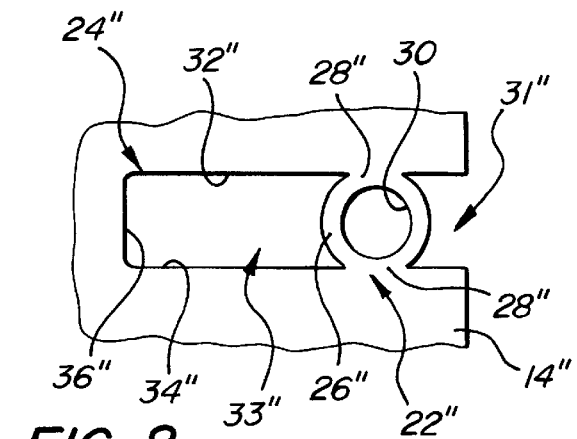
FIG. 8 is a magnified view of a lap joint slot constructed according to a third embodiment of the present invention.
Figure 9:
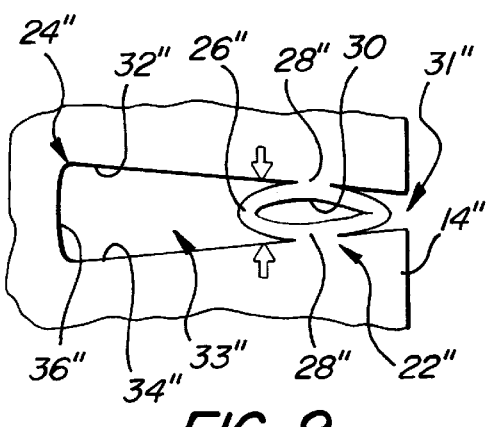
FIG. 9 is a magnified view of the lap joint slot of FIG. 8 after the outer pipe is collapsed.

As shown in FIG. 8, the bridge 26" of the third embodiment is of doughnut shape and comprises a thick-walled generally cylindrical plug. Juncture zones 28" are disposed at diametrically opposite sides of the plug where the bridge 26" merges with or integrally extends from the opposing sidewalls 32", 34". The cylindrical shape of the bridge 26" facilitates its collapse as the sidewalls 32", 34" of the slot 24" move toward each other in response to the application of inward clamping pressure around the lap joint 10". More specifically, an axial through-hole 30 that defines the center of the cylindrical shape of the bridge 26" provides a space for the cylindrical bridge 26" to collapse inward. The collapse may include a deformation of the circular cylindrical shape of the bridge 26" into an oblong or oval cylindrical shape as shown in FIG. 9. As with the first and second embodiments, the bridge 26" collapses into a position that maintains a fluid seal or sealing zone across the slot 24".

As shown at 16 in FIGS. 1, 2 and 3, the preferred clamp 16 for use with the invention comprises a clamping band 72 that is disposed around the outer pipe 14 over the sealing zone 22. The clamping band 72, for sealing purposes, must cover the inboard end of the slot 24 and cover the bridge 26. The clamping band 72 is provided with a tightening means 74. The clamping band 72 is, for the most part, circular or roundish in cross-section. It has a roundish sector 76 adapted to fit around the sealing zone 22 on the pipe 14 and a channel-shaped sector 78 that comprises a pair of sidewalls 82, 84. The sidewalls 82, 84 extend radially outwardly from the roundish sector. The clamping band 72 is made of a single piece of sheet metal and each free end of the band 72 is folded back on itself to form a double layer. Thus, the sidewalls 82, 84 are of double thickness and terminate at their outer ends in respective loops or bights 86, 88. The bights 86, 88 serve as retaining members for holding the sidewalls 82, 84 in place when the tightening means 74 is tightened.

The tightening means 74 tightens the clamping band 72 around the pipe 14. The tightening means comprises a reaction member or spline 92 that is disposed within a channel-shaped sector 78. The spline 92 is adapted to seat upon the outer surface of the sealing zone 22 of pipe 14. For this purpose, the spline has an arcuate inner surface that conforms to the pipe 14. The spline 92 is provided with a pair of oppositely facing concave surfaces 94 and 96. The tightening means includes a bolt 98 and a nut 102. It also includes a spacer 104 disposed outside the sidewall 82 and having a convex surface disposed opposite the concave surface 94 of the spline 92. The bolt 98 has a head 101 with a convex surface that is disposed outside the sidewall 84 opposite the concave surface 96 on the spline 92. The bolt extends through holes in the sidewalls 94 and 96, the spline 92 and the spacer 104.

When the pipe joint 10 is assembled and the nut 102 is tightened on the bolt 98, the relationship of the parts is as shown in FIGS. 1 and 3. Before the nut and bolt are tightened, the sidewalls 82 and 84 of the channel-shaped sector 58 are not seated against the spline 92. When the nut 102 is tightened, the bolt head 101 and the spacer 104 are drawn together and press the sidewalls 82 and 84 into seating engagement with the spline 92. Because of this tightening action, the roundish sector 76 is stretched around the sealing zone 22 of the pipe 14 in tight engagement therewith. This tightening action of the clamp 16 exerts sufficient force on the sealing zone 22 to compress the slot 24 and deform or distort the bridge 26.

Although the description of this invention has been given with reference to particular embodiments, it is not to be construed in a limiting sense. Many variations and modifications will now occur to those skilled in the art. For a definition of the invention, reference is made to the appended claims.

What is claimed is:

1. In a coupling for a pipe lap joint of the type comprising:

an inside pipe and an outside pipe in telescoping relationship to provide an overlap region on the end of each pipe, said overlap region on the outside pipe defining a slot, said slot extending through the end of said outside pipe, a clamping band disposed around said outside pipe and covering said slot, tightening means for clamping said band around said outside pipe to clamp the pipes together and collapse the overlap region of said outside pipe into close fitting engagement with said inside pipe to cause sealing engagement of said outside pipe with said inside pipe and with said band, the improvement wherein:

said slot has first and second sidewalls extending in the general direction of the axis of said outside pipe to an end-wall, said slot has a bridge extending between said sidewalls and dividing said slot into an outboard slot segment extending from said bridge to the end of said outer pipe and an inboard slot segment extending from said bridge to said end wall, said bridge having an axial dimension which is substantially smaller than the axial length of either said outboard slot segment or said inboard slot segment whereby said bridge is deformed when the overlap region of said outside pipe is collapsed into close fitting engagement with said inside pipe by clamping said band around said outside pipe.

2. The invention as defined by claim 1 wherein:

said end wall is of arcuate configuration.

3. The invention as defined by claim 1 wherein:

said first and second sidewalls of said outboard slot segment are in alignment, respectively, with said first and second sidewalls of said inboard slot segment.

4. The invention as defined by claim 1 wherein:

said bridge extends obliquely of said slot.

5. The invention as defined by claim 4 wherein:

said bridge is of substantially uniform width.

6. The invention as defined by claim 1 wherein:

said bridge has a quarter-moon shape.

7. The invention as defined by claim 1 wherein:

said bridge has a doughnut shape.

8. The invention as defined by claim 1 wherein:

said bridge is a deformable plug.

* * * * *